United States Patent
Panter

(10) Patent No.: US 8,739,867 B2
(45) Date of Patent: Jun. 3, 2014

(54) MASS/VOLUME ESTIMATION OF CONTAMINATION, REMOVAL AND/OR IN SITU TREATMENT USING SUBSURFACE PRESSURE WAVES

(75) Inventor: Steven Panter, Lawrenceville, NJ (US)

(73) Assignee: RemMetrik, LLC, Lawrence Township, NJ (US)

( * ) Notice: Subject to any disclaimer, the term of this patent is extended or adjusted under 35 U.S.C. 154(b) by 982 days.

(21) Appl. No.: 12/437,824

(22) Filed: May 8, 2009

(65) Prior Publication Data

US 2009/0277844 A1 Nov. 12, 2009

Related U.S. Application Data

(60) Provisional application No. 61/126,930, filed on May 9, 2008.

(51) Int. Cl.

| | |
|---|---|
| *E21B 47/00* | (2012.01) |
| *E21B 43/00* | (2006.01) |
| *B09C 1/00* | (2006.01) |
| *B09C 1/08* | (2006.01) |
| *C02F 103/06* | (2006.01) |
| *E21B 47/18* | (2012.01) |

(52) U.S. Cl.
CPC . *B09C 1/002* (2013.01); *B09C 1/08* (2013.01); *B09C 2101/00* (2013.01); *C02F 2103/06* (2013.01); *E21B 47/18* (2013.01)
USPC .......... 166/250.01; 166/311; 166/252.1; 166/252.6; 166/313; 166/268; 166/90.1; 166/279; 166/371; 166/306; 210/747.7

(58) Field of Classification Search
None
See application file for complete search history.

(56) References Cited

U.S. PATENT DOCUMENTS

| | | | |
|---|---|---|---|
| 4,435,292 | A | 3/1984 | Kirk et al. |
| 4,593,760 | A | 6/1986 | Visser |
| 4,730,672 | A | 3/1988 | Payne |
| RE33,102 | E | 10/1989 | Visser |
| 5,279,740 | A | 1/1994 | Basile et al. |
| 6,241,019 | B1 | 6/2001 | Davidson et al. |

(Continued)

FOREIGN PATENT DOCUMENTS

GB 2324819 A 11/1998

OTHER PUBLICATIONS

International Search Report and Written Opinion, dated Oct. 26, 2009 of International Application No. PCT/US2009/043434, filed: May 11, 2009.

(Continued)

*Primary Examiner* — Krishnan S Menon
(74) *Attorney, Agent, or Firm* — Pergament Gilman & Cepeda LLP

(57) ABSTRACT

A remediation process that a employs improved quantitative method(s) of estimating of the volume and/or mass of contaminant in the subsurface, removal and or in situ degradation of the contamination using subsurface pulsing treatment ("SPT") technology, and evaluation of the degree of remediation by re-applying the quantitative contaminant evaluation methods. The process uses SPT technology with the addition of a vacuum or sub-atmospheric pressure to an extraction well in order to create a push-pull effect to remove free contaminant or residual in conjunction with the pressure wave driving force created in the excitation or excitation well. The process can quantitatively measure the amount of residual contaminant, which up until now has not been possible or tractable using in situ methods, as well as measure the amount of residual that can be removed by SPT.

29 Claims, 6 Drawing Sheets

(56) References Cited

U.S. PATENT DOCUMENTS

| | | |
|---|---|---|
| 6,405,797 B2 | 6/2002 | Davidson et al. |
| 6,581,473 B2 | 6/2003 | Takahara et al. |
| 6,659,176 B2 | 12/2003 | Mahadevaiah |
| 6,840,091 B1 | 1/2005 | Stewart |
| 6,851,473 B2 | 2/2005 | Davidson |
| 2002/0058597 A1 | 5/2002 | Ivey |

OTHER PUBLICATIONS

International Preliminary Report on Patentability, dated Nov. 18, 2010 of International Application No. PCT/US2009/043434, filed: May 11, 2009.

Operations Manual for Persulfate Resistant Armadillo Tool, Nov. 2005.

Primawave Wavefront Sales Brochure, unknown date.

LNAPL Distribution and Recovery Model (LDRM) vol. 1: Distribution and Recovery of Petroleum Hydrocarbon Liquids in Porous Media, API Publication 4760, Jan. 2007.

LNAPL Distribution and Recovery Model (LDRM) vol. 2: User and Parameter Selection Guide, API Publication 4760, Jan. 2007.

Lenhard, J.C. and Parker, R.J., Estimation of Free Hydrocarbon Volume from Fluid Levels in Monitoring Wells, Ground Water, Jan.-Feb. 1990, pp. 57-67, vol. 28, No. 1.

Farr, A.M. Houghtalen, R.G. and McWhorter, D.B., Volume Estimation of Light Nonaqueous Phase Liquids in Porous Media, Ground Water, Jan.-Feb. 1990, pp. 48-56, vol. 28, No. 1.

Fagerlund, F., Illangasekare, T.H. and Niemi, A., Nonaqueous-Phase Liquid Infiltration and Immobilization in Heterogeneous Media: 2. Application to Stochastically Heterogeneous Formations, Vadose Zone Journal, Aug. 2007, pp. 483-495, vol. 6, No. 3, Soil Science Society of America.

Panter, S.E., Mobilizing Residual Non-Aqueous Phase Residual Contamination Using Pressure Pulse Technology, Mar. 13, 2008, Battelle Memorial Institute.

Wiedemeier, T.G., Rafai, H.S., Newell, C.J. and Wilson, J.T., Natural Attenuation of Fuels and Chlorinated Solvents in the Subsurface, 1999, pp. 104-106, John Wiley & Sons, Inc.

Einerson, M.D. and Mackay, D.M., Predicting Impacts of Groundwater Contamination, Environmental Science & Technology, 2001, pp. 66A-73A, vol. 35, No. 3, American Chemical Society.

Einerson, M.D. and Mackay, D.M., Supplementary Material to Accompany Predicting Impacts of Groundwater Contamination, Environmental Science & Technology, 2001, American Chemical Society.

Annable, M.D. et al. (eds.), Mass Flux as a Remedial Performance Metric at NAPL Contaminated Sites, from book Methods and Techniques for Cleaning up Contaminated Sites, 2008, pp. 177-186, Springer, Netherlands.

Adamski, et al.—"LNAPL in Fine-Grained Soils: Conceptualization of Saturation, Distribution, Recovery, and Their Modeling," Ground Water Monitoring & Remediation 25, No. 1/Winter 2007/pp. 100-112.

Gallagher, et al.—"Mass Based Corrective Action", NGWA Petroleum Hydrocarbons Conference, Houston, Texas, Nov. 1995, pp. 453-465.

Pankow, et al., "14.7.2.4 Mass-destruction technologies" and "14.7.2.5 Prospects for source zone restoration", Dense Chlorinated Solvents and Other DNAPLs in Groundwater: History, Behavior, and Remediation, 1996, title page and pp. 501-503, Waterloo Press, Portland, Oregon.

MASS/VOLUME ESTIMATION OF CONTAMINATION, REMOVAL AND/OR IN SITU TREATMENT USING SUBSURFACE PRESSURE WAVES

FIELD OF THE INVENTION

This mechanical process involves propagating subsurface pressure (excitation) waves that strain elastic porous media or fractured geologic media such that the induced pressure wave energy increases pore space, voids, or aperture size. The pressure waves promote a dynamic porosity that also increases pore size and interconnectivity and simultaneously causes fluids to both dispense and disperse, and otherwise mobilize and flow. The process also causes residual fluids to flow and this is currently the only known method to have this effect on a range of geologic media. Collectively, the described flow effects are known as subsurface pulsing treatment (SPT). SPT is utilized to more accurately estimate the volume and/or mass of recoverable residual non-aqueous phase liquids ("NAPL"). One known means for propagating subsurface pressure waves is through the equipment and science disclosed in U.S. Pat. Nos. 6,241,019; 6,405,797; 6,851,473 and U.K. Patent Number 2324819. This technology is marketed under the trademarks DEEPWAVE, PRIMAWAVE and POWERWAVE.

BACKGROUND OF THE INVENTION

The remediation of soil and groundwater contaminated by light (lighter than water) non-aqueous phase liquids (LNAPL) and dense (heavier than water) non-aqueous phase liquids (DNAPL), collectively known as non-aqueous phase liquids (NAPL), remains a difficult problem where these contaminants exist as a residual (undissolved) or free product within a soil and/or rock matrix. LNAPLs (e.g., oily substances that float in water) and DNAPLs (e.g., chlorinated solvents, coal tar, creosote, that sink in water) are not readily removable in their entirety and continue to contaminate groundwater and soil and prevent or restrict use of the site in which these contaminants exist, or pose a threat of migration onto nearby properties. In the case of LNAPL, free product can adversely impact soil and groundwater and migrate onto other properties. Sometimes the LNAPL contains in solution other compounds that are even more toxic than the pure LNAPL (e.g., polychlorinated biphenyls [PCBs] or benzene), and in this case a less toxic LNAPL can serve as a transport medium for the more toxic compound(s).

One of the difficulties in remediation of LNAPLs and DNAPLs is that the mass or volume of contaminant is poorly understood or completely unknown. In the case of LNAPLs, invalid methods are most often employed to estimate the volume of contaminant, so the recoverable quantity of contaminant is overestimated or underestimated and the benchmarks for cleanup are uncertain or unknown; largely they are unattainable and unrealistic using conventional products and methods. The non-recoverable LNAPL, that portion sequestered within the soil or rock matrix, i.e. the residual, remains behind in pore spaces or voids and continues to adversely affect soils and groundwater. The residual is vastly more difficult to remove than the free product using conventional in situ methods and, in practice, removal is effectively infeasible.

In the case of DNAPLs, the contaminant volume and/or mass is also uncertain or unknown. Again, accurate, reliable estimates of the contaminant mass frequently do not exist. Removal of subsurface DNAPL is very difficult because these compounds dispense, forming fingers and pools making them very hard to locate and accurately quantify. Most of the DNAPL exists as a residual that occupies the pore spaces or voids and is exceedingly difficult to remove, treat, or otherwise access, depending on the site geological characteristics. As with LNAPL, DNAPL residual removal is effectively infeasible.

Removal of LNAPL and DNAPL meets with varying degrees of success depending on the recovery or treatment method, the understanding of the contaminant, geology, the mass or volume present and available for removal or treatment, and clear and attainable benchmarks for cleanup.

The reason why LNAPLs and DNAPLs are so difficult to remove is that the contaminants occupying the small voids, pore spaces, or apertures within the soil or rock matrix are strongly held and effectively immobilized by capillary forces. Depending on the size of the pores, voids, or apertures, the LNAPL or DNAPL is more strongly or weakly held; smaller openings hold contaminants more strongly No known conventional technology can effectively remove contaminants from the pores or voids while the geologic media remains in place (in situ).

Most often, contaminant levels are compared against numerical cleanup standards for soil or groundwater. However, the remedial process frequently, for practical purposes, ignores the mass or volume of contaminant. Effective remediation of the source mass or volume is paramount if remediation is to ultimately be effective and restore groundwater resources, soil, and real estate to productive use and protect the public and the environment. Removal and/or destruction of contaminant mass are of overriding importance.

One example of ground contamination remediation is discussed in U.S. Pat. No. 4,435,292. In this method, perforated pipes and wells are inserted into the ground of a contaminated site, wherein a number of the pipes and wells are pressurized and others are simultaneously evacuated to effect the transfer of flushing fluid through the soil to accelerate removal of contaminants, and to prevent migration of contaminants into other areas. The system is closed and pressurized at one end and evacuated at another end, for example, by evacuating ducts connected to a central pressure manifold. The flushing fluid may be either liquid or gaseous, e.g. an inert gas such as nitrogen, or a reactive system which would react with the contamination to form an inert or harmless chemical.

The process, however, suffers from the need to have a reliable benchmark as to the mass or volume of contaminant present so as to know how much treatment chemical is required and for how long treatment will take, and a reliable benchmark as to when the contaminant has been effectively neutralized or destroyed. The process relies on subsequent soil and groundwater contaminant measurements to determine when treatment is complete. These types of measurements are notoriously variable and a great many data points from a plurality of locations, over time and in several seasons are required to evaluate whether treatment is complete. Another important limitation of this approach is that the greatest contaminant concentrations do not necessarily coincide with the location of the greatest amount of contaminant mass or volume. Even with abundant measurements, rebound, i.e. the contamination from residual contaminant that continues to migrate back into groundwater, may appear well after the data suggest that remediation is complete. Without a reliable before and after estimation of volume or mass, effective treatment is uncertain and questionable. This issue is of great importance to environmental regulatory agencies, or other bodies charged with deeming remediation complete to protect the public and the environment.

The flushing process is also dependent on the geologic media that control fluid movement and how effectively the treatment method reaches the contaminants. Most commonly, treatment fluids follow preferential pathways, also known in the field as "fingering," channels of easiest fluid movement and, as such, treatments and/or removal processes reach only a small percentage of the contaminant mass; most of the contaminant mass remains untreated, where it continues to adversely impact soil and groundwater. This method (U.S. Pat. No. 4,435,292) does not have the capacity to alleviate fingering as it relies on the inherent geologic properties and does not alter, i.e. increase, the conductivity of the geologic medium so as to promote or enhance remediation.

Another attempt at soil and groundwater decontamination is described in U.S. Pat. No. 5,279,740. This process represents an improvement over the aforementioned approach and consists of a mechanism of contaminant removal using at least two injection wells positioned in the contaminated zone and at least one extraction well to remove the mobilized contamination. Steam is then introduced into the ground and forced into the contaminated zone while simultaneously introducing treatment agents, if desired. A removal force is then applied to the extraction well for withdrawal of the contaminants. Enhanced removal and treatment are contemplated using this process. In an ideal setting, an array of steam injection wells and extraction wells covers the contaminated area. This process suffers from the same limitations noted in the first example. Without reliable estimates of contaminant mass or volume, the same deficiencies remain with regard to lack of meaningful benchmarks to gauge before and after treatment. The second example contemplates the use of an extraction well and an extraction force, but the approach is subject to the same limitation caused by preferential pathways, "fingering" that causes contaminant removal or treatment to contact only a fraction of the total contaminant mass, and typically the mass that is most easily treated and/or removed. Again, this process does not alter the conductivity of the geologic medium so as to promote or enhance remediation.

Other methods to alleviate soil and/or groundwater contamination employ the creation of a vacuum within a withdrawal well situated in the vadose zone. Air injected into the well at various points surrounding the withdrawal well urge the flow of contaminants towards the withdrawal well where they are vaporized and collected in the well by vacuum. Examples of this method are described in U.S. Pat. Nos. 4,593,760 and Re. 33,102.

A variation of the vacuum method mentioned above is discussed in U.S. Pat. No. 4,730,672, which presents a method for removing and collecting volatile liquid contaminants from a vadose zone of contaminated ground by an active closed-loop process, in which a vacuum source in a perforated conduit in a withdrawal well is situated in a contaminated vadose zone and creates a reduced pressure zone to cause contaminants contained therein to vaporize and be drawn in to the withdrawal conduit for collection and disposal. While effective for the removal of some easily volatilized liquid contaminants in the vadose layer, such methods have proved to be of limited value in the removal and disposal of many other common subsurface contaminants. Additionally, such methods are not useful for removal of contaminants situated below the water table in a saturated zone.

All the methods described above are employed either with or without any reliable measure of contaminant mass or volume, before and/or after, and work within the existing geologic framework. The effectiveness of these measures is dictated or limited by the existing porosity, voids, or aperture size, and permeability of the geologic media within which the contamination resides. One characteristic all the aforementioned methods have in common is that they treat the geologic conditions as though they are static and immutable. They focus exclusively on the concentration levels of contaminant and neglect soil, geologic and fluid physical properties.

Accordingly, there is a need for an integrated assessment-remediation process that accurately estimates the volume or mass of NAPL, rapidly removes the NAPL and/or treats the NAPL in situ, and then quantitatively evaluates whether the contaminant volume or mass has been remediated following treatment. There is a need for an evaluation process that factors both soil and fluid properties and/or changes in contaminant mass in estimating their mass and/or volume before, after and/or during treatment so as to monitor/adjust treatment effectiveness in real time. There is a need to more efficiently access the contamination so that it may be rapidly physically removed from the geologic media and/or treated with an agent that destroys and/or neutralizes the contaminant or otherwise renders it non-toxic. Restoration by means of rapidly altering the physical properties of the geologic media, e.g. porosity, conductivity and permeability, in the saturated zone below the water table and/or the capillary fringe above the water table, is fundamental to the process. By promoting more effective in situ remediation, the public will be protected because it will not be exposed to excavated contaminant that frequently results in noxious odors and toxic or nuisance particulates.

SUMMARY OF THE INVENTION

The present inventive process satisfies the above-stated need and provides for the improved removal and/or in situ treatment of contaminants from a contaminated subsurface area of the earth.

The combining of the capillary pressure method for yielding reliable before-and-after treatment estimates of LNAPL or hydrocarbon volume and mass flux method for providing reliable before and after treatment estimates of the mass of DNAPLs or chlorinated compounds with a remediation method that overcomes fingering and preferential pathways or other resistance in the geologic media by rapidly altering the physical properties of the geologic media (porosity, conductivity and permeability) in the saturated zone below the water table and in the capillary fringe above the water table to promote remediation, represents a unique and beneficial process for restoring groundwater and soil to protect the public and returning property to a useful purpose.

In accordance with this invention, there is provided a process for evaluation of mass and/or volume of contaminant in a saturated subsurface environment before removal and/or treatment, a means of promoting remediation by altering the physical properties of the geologic media such that fingering and paths of least resistance are overcome, resulting in vastly greater contact between the treatment agent and the contaminant, increasing the conductivity of the geologic medium, a means of treating and/or removing contaminant, a means of mobilizing residual NAPL, and a means of re-evaluating the effectiveness of treatment, if warranted, by means of reliably estimating the volume or mass of contaminant treated following the remediation process in the saturated zone and capillary fringe zone wherein the process comprises some or all of the following steps:

(a) Estimate the mass and/or volume of an LNAPL using a capillary pressure method such as that developed by Anne Farr et al. 1990 and Lenhard and Parker 1990 and modified by Adamski et al. 2005. This is to be accomplished using environmental site data collected for the specific purpose and/or using a priori data collected from earlier site investigation(s). Determine the area of retention of LNAPL using at least two soil borings and/or monitoring wells positioned such that they define the area of retention and characterize the free LNAPL in the Area of Retention. The borings and wells are positioned such that they extend from the vadose zone through the water table to some point below the seasonal water table fluctuation or LNAPL smear zone.

(a)(1) Estimate the amount of contaminant mass of residual LNAPL in soil or other geologic media using the soil sampling results for the contaminants of interest, using the method by Gallagher et al. 1995 or similar or equivalent method, and the sampling depth information to prepare contaminant mass estimates and/or prepare isocontours of the contaminant mass such that the amount and location of contaminant mass are reasonably approximated. The purpose of this step is to target to contaminant treatment areas most effectively and to determine the treatment dose of an amendment, if needed, so as to optimize treatment of the contamination, and as a basis for determining treatment effectiveness. This will shorten and improve the efficacy of remediation by accurately targeting the contaminant source mass.

(b) Collect water table measurements and product thickness measurements such that a reasonable estimate of water table fluctuation is known.

(c) Collect soil samples for analysis for the percent saturation of hydrocarbon and collect groundwater and LNAPL for fluid properties (density, surface tension, interfacial tension).

(d) Alternatively, if DNAPL is the contaminant, employ steps a, a(1), b, and c, but sample the wells for the dissolved DNAPL concentrations and estimate the DNAPL mass flux using the method presented by Einerson and Mackay. Use of the mass flux method is contemplated for both measuring the amount of contaminant and to serve as a means of monitoring treatment effectiveness by collecting serial groundwater measurements (before and after treatment) and as a means of adjusting treatment dosage to optimize the amount of treatment necessary. In this manner, additional treatments may be effected adding only the incremental amount of amendment needed, if necessary. This is a cost control measure and a means of keeping the amount of treatment chemical added to the environment to the minimum required for remediation.

(e) With the Area of Retention reasonably known and a reliable estimate of the recoverable contaminant volume and/or mass in hand or, in the case of DNAPL contamination, the mass flux and/or mass reasonably known through contaminant measurements, and the center of mass and location in physical space within the geologic media of the LNAPL or DNAPL reasonably known through testing and a workable site conceptual model, establish at least one SPT well within or near the contaminant mass, capable of allowing the means for inducing subsurface pressure waves that strain the geologic formation such that it results in a dynamic porosity that both dispenses and disperses fluids and at least one extraction well within the influence of the pulsing well.

(f) engage the pulsing well such that pressure waves develop in the subsurface so as to induce strain forces resulting in a dynamic porosity that both dispenses and disperses fluids in the subsurface. The pressure waves must be of the proper amplitude and frequency, consistent with the geologic properties, in order yield effective wave energy. Achieving the appropriate frequency and amplitude is an iterative process done in the field. Experience and knowledge of local conditions will have a far greater impact than any algorithm or process for determining frequency and amplitude values.

(g) applying a withdrawing force to the extraction well when removal of LNAPL or DNAPL is warranted, where the said LNAPL and/or DNAPL contamination is caused to be drawn through the contaminated subsurface area to cause at least a portion of said contaminants in said subsurface saturated and capillary fringe zone to be displaced toward the perforated lower portion of said extraction well, in liquid or vaporized form or in a combination thereof, and where said contaminants are withdrawn through the extraction well and removed from said contaminated subsurface area for further treatment and/or disposal. Use of technology simultaneously in conjunction with a withdrawal force constitutes a "push-pull" effect to enhance liquid contaminant extraction and treatment. Applying a withdrawal force has two purposes: (1) to actively promote and enhance removal of contaminant, and (2) to prevent any mobilized contaminant from reaching receptors such as river, streams, nearby properties, residences, etc.

In a preferred embodiment of the present invention, a process is provided for estimating the mass and/or volume of contaminants from a contaminated subsurface area of the earth having a subsurface water table, a subsurface saturated zone below the water table, and a capillary zone above the water table, and wherein contaminants are present in either or both the saturated zone and the capillary zone, and where the process comprises the steps of the following:

(a) establish at least one injection and excitation well extending downwardly from the surface of the ground, wherein the injection well(s) has a perforated lower portion allowing pressure wave and strain forces to emanate into the formation, and wherein said perforated lower portion of the injection well is disposed in or is proximate to the subsurface saturated zone and capillary fringe zone.

(b) establish at least one extraction and excitation well extending downwardly from the surface of the ground wherein the extraction well has a perforated lower portion allowing flow of material there into, and wherein the perforated lower portion of the extraction well is disposed in or is proximate to the subsurface saturated zone and the perforate lower portion of the other of the extraction wells is disposed in or is proximate to the capillary zone.

(c) induce pressure wave (SPT) excitation stimulus into at least one of said injection wells where the pressure waves induce strain causing a dynamic porosity in the geologic media from said perforated lower portion into the subsurface saturated zone and/or capillary zone.

(d) simultaneously or subsequently introducing nutrients, chemical oxidants, or other treatment agents into the injection well wherein the treatment agents are caused to flow from the lower perforated portion of the injection well into the pores, voids, or apertures in the saturated zone and capillary fringe zone to effect the enhanced degradation and/or transformation of at least a portion of the contaminants present.

The contemplated process may be used in conjunction with a 'value fluid,' such as petroleum, crude oil, or, refined petroleum product, etc., such as might be found in an oil field, refinery spill, bulk storage facility spill, or petroleum processing facility spill.

The present invention is more fully described in the following detailed description with reference to additional illustrative preferred embodiments.

BRIEF DESCRIPTION OF THE DRAWINGS

The foregoing summary, as well as the following detailed description of preferred embodiments, is better understood when read in conjunction with the appended drawings. For the purpose of illustrating the invention, there is shown in the drawings exemplary constructions of the invention; however, the invention is not limited to the specific methods and instrumentalities disclosed.

In the drawings.

DETAILED DESCRIPTION OF THE INVENTION

Figure 1:
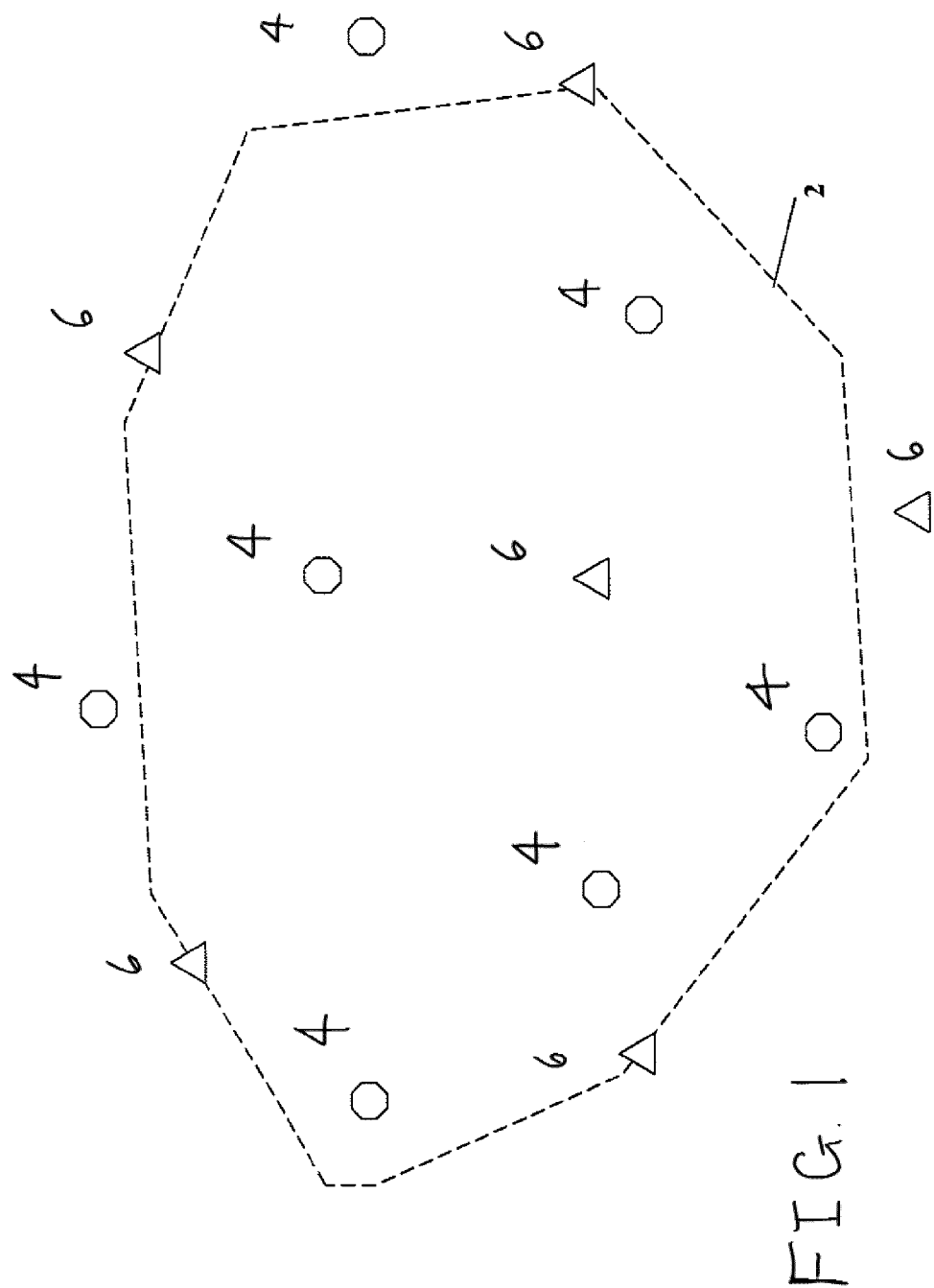
FIG. 1 is a plan view showing the general layout of soil borings and monitoring wells to estimate the contaminant volume using the capillary pressure method.

The present invention is useful for the in situ removal and/or in situ treatment of contaminants from a contaminated subsurface area of the earth and is especially useful for removing and/or rendering innocuous non-naturally occurring hydrocarbon contaminants. By use of the phrase "non-naturally occurring hydrocarbon contaminants," this invention contemplates, as a non-limiting example, the removal of such hydrocarbons that are commonly found in petroleum such as aromatics, alkanes, olefins and heterocyclic compounds, and various derivatives of these compounds, such as alcohols, esters, ketones, carbonates, acids, and other halogenated derivatives. Especially contemplated for removal are halogenated aliphatic compounds such as trichloroethylene and 1,1,1-trichloroethane, which are typically employed as dry cleaning and industrial degreasing solvents, although it will be understood that the subject matter described herein and claimed is in no way limited to the removal of any particular compound except in those instances (should there be any such instances) where stated clearly and unequivocally.

Contaminated subsurface areas contemplated for cleanup and decontamination in accordance with this invention are areas having a subsurface water table, a subsurface saturated zone below the water table, and a subsurface capillary zone. A capillary or capillary fringe zone in which contaminants exist in both liquid and vapor form lies directly above a subsurface water table. The capillary zone can be defined as a transition region from the subsurface water table to the vadose (unsaturated) zone. For purposes of the present invention, however, the capillary zone is contemplated as being an extension or portion of the water table.

To effect the removal and/or in situ destruction of hydrocarbon contaminants from a contaminated subsurface area in accordance with this invention, a system of wells is put in place which is disposed within, around, or otherwise in close proximity to an area suspected of contamination. Wells of unconventional, e.g. wells capable of conveying excitation pulses into the geologic medium, and conventional design, e.g. injection and extraction wells, or combinations thereof, are contemplated for use in this invention. The excitation well, e.g. wells containing SPT equipment sold under the trademarks DEEPWAVE, PRIMIWAVE or POWERWAVE, which is able to induce pressure waves and strain stimulus that dispenses treatment agents within a contaminated area of subsurface earth, is critical to the process. At least one excitation well is contemplated for introducing the pressure stimulus as well as injecting treatment or removal agents or, if desired, only for introducing chemical oxidants or other treatment agents to effect the destruction and/or removal of contaminants. The terms excitation and injection are sometimes used interchangeably in the context of the present invention. The excitation waves being 'injected' through a well that may also be capable of injecting steam, occident surfactant or other treatment fluid, this interchangeability is appropriate.

The excitation well is constructed of a fluid impermeable conduit material disposed in boreholes, and has a perforated lower portion disposed in a subsurface saturated zone, i.e., below the water table, and which allows for injected pressure stimulus and treatment/removal agents to be introduced below ground level and into the saturated zone and capillary zone. Preferably, there are a multiplicity of such pressure stimulus SPT excitation wells, each which may depend upon such factors as the size and subsurface geology of the specific contaminated area to be treated, and the specific nature of the contamination.

Disposed among the injection wells is preferably, at least, one return or extraction well, which is of conventional design, and constructed of impermeable conduit material disposed in a borehole and having a perforated lower portion disposed in a subsurface saturated zone and capillary zone, which allows for the withdrawal of contaminant-bearing groundwater and/or non-value liquid from the saturated zone and capillary zone to the surface for treatment and removal of the contaminants. There are preferably multiplicities of such extraction wells located among and spaced apart from the aforesaid excitation well(s), to form an array or pattern of injection/excitation and extraction wells.

By application of a withdrawing force, e.g., by the mechanical action of a pump or by sub-atmospheric pressure applied by a vacuum pump, or by heat of compression from treatment agents reacting with the contaminants, to the extraction wells, and in tandem with the simultaneous pressure stimulus and dynamic porosity increase and injection of treatment amendments via SPT, gases and fluids including contaminated material in various physical states are caused to be displaced from their location in the saturated and capillary zones toward the perforated lower sections of the extraction well(s) (or uncased bore hole in the event that the extraction well is in rock). Such gases and liquids are then withdrawn through the perforated portions and up the extraction wells to the surface for treatment and/or disposal, to effect decontamination of targeted substances in areas of the earth. The amount of vacuum necessary to effectuate removal of non-value or value liquid without killing the SPT excitation well by creating a preferential pathway (short circuiting) is to be determined in the field by the supervising scientist or engineer. At present there is no known means of calculating the proper vacuum; it must be determined on an empirical basis by a scientist or engineer experienced with the SPT process.

In accordance with this invention, the application of pressure stimulus via one or more excitation wells effects the movement and dissolution of subsurface non-volatilized contaminants to facilitate their removal by the applied withdrawing force at the extraction wells in areas near or contiguous to the injection (excitation) wells. Especially targeted are pools, fingers, blobs, ganglia, or other concentrations of non-dissolved, residual NAPL contamination. Depending on the particular subsurface geology subject to pressure stimulus application and extraction including such factors as mineral makeup, physical structure, and porosity, the applied pressure stimulus and mobilized compounds and non-value or value liquids, e.g. non-volatilized contaminants, are caused to move in various directions through the subsurface toward the lower perforated portion of the extraction wells in the saturated zone and capillary zone for their eventual removal to the surface. Liquids and otherwise non-volatilized material are coalesced and are mobilized and driven by the excitation process toward the perforated portion of the extraction wells.

Also in accordance with this invention, the injection of pressure stimulus into the subsurface saturated zone and capillary fringe zone is accompanied by the simultaneous injection, also into the saturated and capillary zone, of treatment agents. It has been found that oftentimes contaminating solvents are present in the subsurface in an undissolved state, thus rendering their removal from a contaminated subsurface area, particularly from a saturated zone, difficult, or nigh impossible, using conventional approaches. By employing pressure stimulus in conjunction with treatment agents, the enhanced degradation and/or transformation, and/or destruction of some contaminating compounds or solvents is readily achieved, thereby greatly facilitating their removal via groundwater and/or extraction wells, or facilitating their in situ destruction to harmless by-products. For example, the transformation of tri-chlorinated solvents results in chloride, carbon dioxide and water, which are innocuous and non-toxic.

It will also be appreciated by those persons skilled in the relevant art that the simultaneous injection of pressure stimulus and treatment agents with resulting mobilization and/or destruction of organic compounds and their subsequent removal from a contaminated subsurface area also has the effect of lowering the concentration of such organic contaminants to levels that are less toxic.

A preferred embodiment of this invention is best presented and understood with reference to FIGS. 1-5, and the following discussion thereof. It is to be understood, however, that such discussion is for illustrative purposes only and/or merely sets forth some preferred embodiments and variations thereof will be readily apparent to those persons skilled in the relevant art and are not intended to limit the claims or the spirit thereof in any way.

Referring now to FIG. 1 of the drawings, there is depicted an LNAPL contamination scenario showing the defined LNAPL area of retention (2), a plurality of monitoring wells (4) for the purpose of measuring free product and water table fluctuations and a plurality of soil borings (6) for the purpose of measuring the LNAPL content in soils to define the area of retention (2) and develop estimates of recoverable LNAPL volume using the capillary pressure method. Soil samples obtained during installation of these wells, or from earlier wells/borings can also be used to estimate the contaminant mass and to prepare isocontours identifying the location of the contaminant mass. As shown in this preferred embodiment, the soil borings (6) and monitoring wells (4) extend across the surface of the ground, below which substantially lies the subsurface contaminated area to be evaluated and subsequently treated. FIG. 1 also shows the preferred embodiment of soil borings (6) used to develop an estimate of the residual LNAPL volume using conventional methods. Together, use of the capillary pressure method plus the conventional method for estimating residual is used to develop an estimate of the total undissolved LNAPL volume before treatment using SPT technology, and as a basis for measuring remediation following the application of SPT technology.

The capillary pressure method assumes the NAPL is at static equilibrium and movement of the NAPL in the vertical direction. The capillary pressure method uses energy pulses, e.g. SPT, applied to the subsurface to stress the soil/rock matrix. Before and after the soil/rock properties change in response to pulsing, an estimate is made of the volume of recoverable residual NAPL. Differences between the before and after estimations provides information for determining a more accurate estimation. NAPL thickness is an important variable in estimating the thickness of NAPL and is measured in a monitoring well (4). The ultimate goal is that the "more accurate estimate" of contamination mass/volume is known before removal or abatement begins; thus providing a more reliable metric of success of the removal/abatement.

LNAPL and DNAPL are normally measured by gauging the thickness in monitoring wells. This is performed by inserting a measuring device (interface probe) that detects the interface between water or air and the NAPL. It can also be performed by using a tape measure with paste that is sensitive to water and another sensitive to NAPL, but the interface probe is the most commonly used. DNAPL is more difficult to accurately measure because the thickness can depend on the location of the well relative to the bottom of the DNAPL. LNAPL is lighter than water (by definition) so it is above the water level and is easier to measure.

Difficulty arises when estimating the volume of free-phase or readily recoverable NAPL because the thickness that appears in a given well typically does not reflect the volume available in the geologic formation for recovery. There are several reasons for this. The volume of recoverable NAPL depends on both the soil properties and the fluid properties, and the amount available for conventional recovery varies tremendously with these properties. Despite the thickness in wells, there may be very little recoverable NAPL in some soils even with large NAPL thickness because the thickness is exaggerated by fine-textured soils. The opposite is true as well, as even moderate NAPL thickness in very permeable soils can mean that there is a lot available for recovery.

The amount of NAPL occupying a given volume of soil is a function of soil pore size and fluid properties. However, even with a lot of oil (oil being a common example of NAPL) in a well most of the soil pore space is occupied by water, not NAPL. This is a counter-intuitive result that often results in confusion. The misunderstanding results in errors that result in misguided remediation that is inefficient, ineffective and costly. Residual NAPL, by definition, is very difficult to recover and constitutes a long-term source of contamination.

The capillary test method comprises the following steps:

1. Estimate the total NAPL mass over the soil volume of interest from soil borings, soil physical data (bulk density and porosity), and TPH ("total petroleum hydrocarbons"), total VOC ("volatile organic compounds")+SVOC ("semi-volatile organic compounds") measurements on soil samples. Calculate residual NAPL saturation level (percent) from this data. These calculations are in accordance with known NAPL mass estimation methods. See, e.g., Wiedemeier, T. et al., Natural Attenuation of Fuels and Chlorinated Solvents in the Subsurface, pp. 104-106, (1991), John Wiley & Sons, Inc, which teaches the following as one of several ways that may be used to perform such calculations:

To estimate the source lifetime for use in soil and groundwater modeling, an estimate of the mass of compounds of concern in the source zone is required. Although five methods are discussed [in the Wiedemeier reference], note that there is considerable uncertainty with each of these approaches and that estimating source mass will be a probably be an order-of-magnitude endeavor. The first two mass-estimation methods are incorporated into a natural attenuation modeling program for petroleum hydrocarbon sites developed for and with technical guidance from the state of Florida (Groundwater Services, Inc., 1997b) and in natural attenuation software (Groundwater Services, Inc., 1998). The third method, interwell partitioning tracer tests, has been applied at only a handful of field sites, all of which contain DNAPL. The last two methods are based on analyzing the record of aqueous-phase concentration over time to estimate the source mass and have focused on estimating DNAPL mass. The direct method is based on the concept of different compartments (i.e., vadose zone, smear zone, and dissolved in groundwater) at petroleum-hydrocarbon sites as described by Gallagher et al. (1995) and uses actual site contaminant concentration measurements and dimensions to calculate mass. The vadose zone compartment extends vertically from the ground surface down to the current water table elevation and laterally from the zone of highest contamination to where contamination is no longer detectable. The following methodology describes the estimation of the contaminant mass.

1. Draw concentration isocontours for each sample depth, with the outermost boundary representing a O-concentration or nondetect line.
2. Calculate the average concentration (an area-weighted average is preferable) within each nondetect isocontour for each sampled depth.
3. Multiply (a) the average concentration by (b) the area inside the O-concentration isocontour for each depth sampled. The resulting units will be concentration-area (e.g., mg/kg*ft$^2$).
4. Using each value from the preceding step, average two concentration-area results for two different depths and multiply by the thickness. The resulting units will be concentration-volume (e.g., ft$^3$*mg/kg). Convert the units to concentration-soil mass (e.g., mg/kg*kg) by multiplying by the soil density. These units simplify further to milligrams.

The second compartment to be considered is the smear zone. This zone is defined vertically to lie between the current water table elevation and the lowest known water table elevation, and horizontally to encompass the area containing or having contained measureable amounts of phase-separated hydrocarbons. This compartment probably contains the bulk of the contaminant mass at LNAPL sites.

1. The horizontal extent of the smear zone is established by one of the following methods: either the area containing groundwater wells having at some time contained measureable amounts of NAPL, or those wells having concentrations of dissolved hydrocarbon compounds greater than some threshold value. For gasoline sites, a value of 3000 ppb total BTEX in groundwater has been proposed by Gallagher et al. (1995) as being representative of the smear zone.
2. Soil samples collected within the smear zone both laterally and vertically are then averaged to determine the average soil concentration in the smear zone.
3. To calculate smear zone mass, multiply (a) the average concentration by (b) the volume inside the assumed smear zone and by (c) the assumed soil density.

The third compartment to be considered is dissolved groundwater contamination located in the source zone. This compartment will typically contain only a small fraction of the mass contained in the other compartments and can frequently be ignored when significant amounts of contaminants are present in other compartments.

1. The source zone for contaminated groundwater can be assumed to be of the same lateral extent as the smear zone if a smear zone exists at the site. If no smear zone is known to exist at the site, the groundwater source zone should be defined as the area inside a contour of known concentration (e.g., 1000 to 3000 ppb total BTEX). If the vertical extent of the dissolved groundwater plume is not known, it may be assumed to extend the full thickness of the aquifer, or 10 ft, whichever is less.
2. Groundwater concentrations located inside the source zone are then averaged both spatially and temporally.
3. To determine the dissolved mass of key compounds, multiply (a) the average concentration, by (b) the area of contaminated groundwater, by (c) the assumed or actual vertical extent, and by (d) the porosity of the aquifer matrix.

See Wiedemeier, T. et al., Natural Attenuation of Fuels and Chlorinated Solvents in the Subsurface, pp. 104-106, (1991), John Wiley & Sons, Inc.

Step 1 is a direct measure of the total NAPL mass in the soil volume. The purpose is to obtain an estimate of the percent NAPL saturation. This serves as a benchmark for comparison with the estimates from Steps 2 through 6. Having an estimate of the percent NAPL saturation provides another means of comparing what is removed to what was there originally. That is, it is used as a metric of completeness.

2. Estimate the static (non-pulsed) volume of recoverable NAPL using the capillary pressure methods using LNAPL measurements in monitoring wells over the area of interest. Convert to the estimated volume to mass. This static estimation may be calculated using Farr, A. M., et al., Volume Estimation of Light Nonaqueous Phase Liquids in Porous Media, Ground Water (1990), Vol. 28, No. 1, pp. 48-56, John Wiley & Sons, Inc., and/or Lenhard, R. J. and Parker, J. C., Estimation of Free Hydrocarbon Volume from Fluid Levels in Monitoring Wells, Ground Water (1990), Vol. 28, No. 1, pp. 57-67, John Wiley & Sons, Inc., both of which are incorporated herein by reference in their entireties. Other methods exist, though these, it is believed, are the most appropriate, accurate, and field proven methods of estimating the amount of recoverable NAPL in monitoring wells because of the difficulties described in measuring NAPL, above. Other methods are prone to errors in estimating the volume of recoverable free-phase NAPL. That said, Farr and Lenhard teach calculations that may be used to estimate the static (non-pulsed) volume of recoverable NAPL using capillary pressure methods as follows:

The Brooks-Corey and van Genuchten equations may be used to relate fluid contents to capillary pressures.

The symbol D represents a depth measured from the ground surface. The subscript w on D denotes a depth measured in an observation well open for fluid entry over its entire length. The subscript a on D denotes a depth measure in the porous medium penetrated by the observation well. The superscripts w, o, and a, refer to water, organic liquid (LNAPL), and air, respectively. The depth $D_\alpha^{ao}$ is the depth in the porous medium at which the air-organic capillary pressure is the minimum required for continuous air and organic liquid to exist simultaneously within a representative volume element. Similarly, the depth $D_\alpha^{ow}$ is the depth in the porous medium at which the organic-water capillary pressure is the minimum required for continuous organic liquid and water to exist simultaneously.

Equality of pressures between the water in the well and in the adjacent porous medium requires the water table to be above the water level in the well by an amount h, and further, that $$h = \frac{\rho o}{\rho w} T \qquad (1)$$

where ρo=density of the organic liquid, ρw=density of the water, and T=$D_w^{ow}-D_w^{ao}$ is the thickness of the LNAPL layer in the monitoring well. Thus, the level of neither LNAPL nor water in the monitoring well is equal to the water-table elevation. It is to be noted that the LNAPL does not form a distinct layer floating on top of a capillary fringe. Such a distribution would violate the fundamental equations that describe the fluid pressure distributions in the porous media and in the monitoring well under the condition of mechanical equilibrium. Pore-water pressure above the water table is negative relative to atmospheric pressure. Likewise, LNAPL in the porous medium located above the air-LNAPL interface in the observation well exists at negative gage pressure.

The values of $D_\alpha^{ao}$ and $D_\alpha^{ow}$ are readily calculated from hydrostatics (Corey, 1986) with knowledge of the relevant displacement pressures and the interface levels in the observation well. The following results are obtained:

$$D_a^{ao} = D_w^{ao} - \frac{P_d^{ow}}{\rho o g} \quad (2)$$

$$D_a^{ow} = D_w^{ow} - \frac{P_d^{ow}}{(\rho w - \rho o)g} \quad (3)$$

where $P_d^{\alpha o}$=air-organic displacement pressure, $P_d^{ow}$=organic-water displace pressure, and g=acceleration of gravity. Equation (3) can be written as $$D_a^{ow} = D_w^{ao} + T\frac{P_d^{ow}}{(\rho w - \rho o)g} \quad (4)$$

Because $D_\alpha^{ow}$ must always be greater than or equal to $D_w^{ao}$, it is concluded that equations (2) and (3) are applicable only for $$T \geq \frac{P_d^{ow}}{(\rho w - \rho o)g} \quad (5)$$

From a physical point-of-view, inequality (5) expresses the condition that if any of the LNAPL in the porous medium exists at positive pressure (i.e., $D_\alpha^{ow}>D_w^{ao}$), there will result an LNAPL layer in the observation well that is at least $P_d^{ow}/_{(ow-\rho o)g}$ units thick. On the other hand, if the volume of LNAPL per unit area in the porous medium is less than a critical value, all LNAPL will exist at negative gage pressures, and equations (2) and (3) do not apply. [ ] Note that the observation well does not reveal the presence of the LNAPL in the subsurface in this case. The critical volume that must be exceeded to result in the presence of LNAPL in the well is given explicitly at a later point in the analysis. It is important to note that even a small excess (theoretically infinitesimal) of the critical volume will cause T to jump from zero to $P_d^{ow}/_{(\rho w-\rho o)g}$.

Porous media for which the displacement pressures are effectively zero will not result in the above discontinuous behavior of the relationship between LNAPL volume in the porous medium and the thickness of LNAPL in the observation well. [T]he function $V_o(T)$ will be continuous for all T≥0 [where T≥0=volume of LNAPL in the porous medium corresponding to a thickness T of LNAPL in a well]. The significance of $V_o(0)=0$ is that the presence of any nonresidual LNAPL in the porous medium, regardless of its volume, will be revealed by the presence of LNAPL in the observation well.

[T]he volume of nonresidual LNAPL in the porous medium given by $$V_0 = \Phi\left\{\int_{D_a^{owa}}^{D_a^{ow}}(1-S_w)dz - \int_{D_a^{owa}}^{D_a^{ao}}[1-(S_w+S_v)]dz\right\} \quad (6)$$

where $V_0$=volume of organic liquid (LNAPL) in porous medium per unit area (L), Φ=porosity of medium, $S_w$=saturation of water, $S_o$=saturation of organic liquid, z=vertical coordinate measured positive downward [L], and other symbols are as previously defined. The values for $D_\alpha^{ao}$ and $D_\alpha^{ow}$ are determined from equations (2) and (3) respectively for porous materials with nonzero entry pressures (e.g., Brooks-Corey porous media). The displacement pressures in equations (2) and (3) are set equal to zero for porous media with zero entry pressures (e.g., van Genuchten porous media).

The symbol $D_\alpha^{\alpha ow}$ denotes the depth to the top of the body of continuous LNAPL. While it is possible for continuous LNAPL to extend to the ground surface, such a situation requires either a large volume of LNAPL in the porous medium and/or small depths to the water table. If continuous LNAP does extend to the ground surface, the lower limits in the integrals of equation (6) are zero. In all other cases, $D_\alpha^{\alpha ow}$ is calculated as the point at which the saturation of LNAPL is zero. The specific manner in which this is accomplished is clarified in subsequent paragraphs.

Evaluation of equation (6) requires that the relationships between $S_w(z)$ and $S_o(z)$ be known. Brooks and Corey (1966) and van Genuchten (1980) present algebraic equations that express fluid contents as a function of capillary pressure in two-fluid systems. Lenhard and Parker (1987, 1988) used concepts first proposed by Leverett (1941) to extend two-phase relationships. In a fluid system comprised of air, LNAPL, and water these concepts can be stated as: (1) the total liquid saturation is a function of the capillary pressure on air-LNAPL interfaces, independent of the individual saturations of water and LNAPL; and (2) the water saturation is a function of the capillary pressure on LNAPL-water interfaces.

Based on the above, the required fluid content relations can be expressed as $$S_o + S_w = (1-S_r)\left(\frac{P_c^{ao}}{P_d^{ao}}\right)-\Lambda + S_r, P_a^{ao} \geq P_d^{ao} \quad (7a)$$

$$S_o + S_w = 1, P_c^{ao} \leq P_d^{ao} \quad (7b)$$

$$S_w = (1-S_r)\left(\frac{P_c^{ow}}{P_d^{ow}}\right)-\Lambda + S_r, P_c^{ow} \geq P_d^{ow} \quad (8a)$$

$$S_w = 1, P_c^{ow} \leq P_d^{ow} \quad (8b)$$

Using the Brooks-Corey (1966) equation. Alternatively, use of the van Genuchten (1980) equation gives $$S_o + S_w = (1-S_r)\left[\frac{1}{1+(a_{ow}P_c^{ao})^n}\right]^{1-1/n} + S_r, n > 1 \quad (9)$$

$$S_w = (1-S_r)\left[\frac{1}{1+(a_{ow}P_c^{ow})^n}\right]^{1-1/n} + S_r, n > 1, \quad (10)$$

where $S_r$=residual saturation of water, $\Lambda$=Brooks-Corey pore-size distribution index, $\alpha$=van Genuchten fluid/solid parameter, and n=van Genuchten soil parameter. The final step is to relate equations (7) and (8) or equations (9) and (10) to equation (6) through $$P_c^{ao} = \rho_o g \left( D_w^{ao} - \frac{P_d^{ao}}{\rho_o g} - z + P_d^{ao} \right) \quad (11)$$

$$P_c^{ow} = \Delta \rho g \left( D_w^{ow} - \frac{P_d^{ow}}{\rho g} - z + P_d^{ow} \right) \quad (12)$$

where $\Delta\rho = \Sigma_w - \rho_o$. Equations (11) and (12) follow from the condition of mechanical equilibrium. The displacement pressures in equations (11) and (12) are simply set equal to zero for use in conjunction with equations (9) and (10). The depth at which the saturation equations predict $S_o=0$ is the depth to the top of the body of continuous LNAPL, $D_\alpha^{aow}$.

Integration of equation (6) for $D_\alpha^{aow} \geq 0$, using the Brooks-Corey relationships [equations (7) and (8)], together with (11) and (12) yields equation (13) after some algebraic manipulation.

$$V_o = \frac{\varphi(1-S_r)D}{1-\Lambda}\left\{\Lambda + \left(1 - \Lambda_-\left(\frac{T}{D}\right)^{1-\Lambda}\right\}, \Lambda \neq 1 \quad (13a)$$

$$V_o = \varphi(1-S_r)[1 - D(1 + \ln T)], \Lambda = 1 \quad (13b)$$

Where $D = \frac{P_d^{ow}}{\Delta\rho g} - \frac{P_d^{ao}}{\rho_o g}$, and $T = D_w^{ow} - D_w^{ao} \geq P_d^{ow}/\Delta\rho g$ When continuous LNAPL extends to the ground surface, $D_\alpha^{aow}$ doesn't exist, and integration of equation (6) using the Brooks-Corey equation results in the following:

$$V_o = \varphi(1-S_r)\left[(T-D) - \frac{P_d^{ao}}{\rho_o g^{(1-\Lambda)}}\left\{1 - \left(\frac{\rho_o g D_w^{ao}}{P_d^{ao}}\right)^{1-\Lambda}\right\} + \right. \quad (14a)$$

$$\left. \frac{P_d^{ow}}{\Delta\rho g(1-\Lambda)}\left\{1 - \left(\frac{\Delta\rho g D_w^{ow}}{P_d^{ow}}\right)^{1-\Lambda}\right\}\right], \Lambda \neq 1$$

$$V_o = \varphi(1-S_r)\left\{(T-D) - \frac{P_d^{ow}}{\Delta\rho g}\ln D_w^{ow} + \frac{P_d^{oa}}{\rho_o g}\ln D_w^{ao}\right\}, \Lambda = 1 \quad (14b)$$

The results in equation (14) show $V_o$ to be dependent upon the fluid levels in the well (relative to ground surface). This is in contrast to equation (13) in which $V_o$ depends only upon the difference and fluid levels. As noted previously, equations (2) and (3) require that T be equal to or greater than $$\frac{P_d^{ow}}{\Delta\rho g}$$

for a Brooks-Corey porous medium with displacement pressure$\neq 0$. The critical volume, below which all the LNAPL is at negative gage pressure, follows from equations (13) upon setting $$T = \frac{P_d^{ow}}{\Delta\rho g}.$$

Further, it is observed that equation (13) predicts the linear relation $$V_o \approx \phi(1-S_r)D(T/D-1)) \quad (15)$$

For large $\Lambda$. Large $\Lambda$ are realized in porous materials with very uniform pore sizes (Brooks and Corey, 1966). The unconsolidated sand used in the example of the next section is such a material. Finally, for sufficiently large T/D, equation (15) becomes $$V_o \approx \phi(1-S_r)T \quad (16)$$

The product $\phi(1-S_r)$ called the effective porosity by Brooks and Corey (1966), is usually in the range of 0.2 to 0.4 for soils.

When using the van Genuchten equation, equation (6) cannot be integrated in closed form and must be evaluated numerically.

Two-phase saturation-pressure relationships can be extended to predict three-phase relationships as discussed by Lenhard and Parker (1987). The interfacial tensions for the three fluid pairs of interest can be used to estimate the values of $P_d$ (Brooks-Corey) or a (van Genuchten) for the other fluid pairs using $$\frac{P_d^{ao}}{\sigma_{ao}} = \frac{P_d^{ow}}{\sigma_{ow}} = \frac{P_d^{aw}}{\sigma_{aw}} \quad (17)$$

and $$\alpha_{ao}\sigma_{ao} = \alpha_{wo}\sigma_{ow} = \alpha_{ow}\sigma_{aw} \quad (18)$$

Where $\sigma_{ij}$=surface tension between fluids I and j. Following the assumption made by Parker et. al. (1987), $S_r$ is considered as a porous media property, independent of fluid properties. The parameters $\Lambda$ and n are considered to be constant porous media properties as well.

See Farr, A. M., et al., Volume Estimation of Light Nonaqueous Phase Liquids in Porous Media, *Ground Water* (1990), Vol. 28, No. 1, pp. 48-56, John Wiley & Sons, Inc., and/or Lenhard, R. J. and Parker, J. C., Estimation of Free Hydrocarbon Volume from Fluid Levels in Monitoring Wells, *Ground Water* (1990); Vol. 28, No. 1, pp. 57-67, John Wiley & Sons, Inc.

3. Subtract the mass result in Step 2 from the mass result in Step 1. This difference is an estimation of residual LNAPL mass.

4. Estimate the minimum LNAPL thickness from individual monitoring well(s) NAPL measurements using fluid entry pressure data from a fluid retention curve, see, e.g., FIG. 6, fluid density information, calculation from fluid properties and grain-size information, and the equation (1):

$$T_o = \frac{\rho_{ow}}{\Delta\rho g}$$

$T_o$ yields the critical NAPL thickness below which all NAPL is residual.

Where:
$T_o$=Original minimum non-zero thickness below which all NAPL is at zero gauge (cm)
$\rho_{ow}$=Entry pressure for the soil type (cm)
$\Delta\rho$=Change in fluid density (g/cm$^3$)
g=Gravity (dynes/gm)
$\rho$=Fluid density (g/cm$^3$), w=water, o=NAPL 5. Estimate residual NAPL, i.e. NAPL not recoverable by standard techniques, that can be recovered by using SPT technology. This estimation is made by stressing the saturated soil/rock matrix using the SPT technology ("estimate pulsing"):

Case 1: Static LNAPL thickness, T, decreases in well after estimate pulsing for a given duration.
   i. Measure the stabilized decrease in NAPL thickness in a monitoring well.
   ii. Subtract this thickness from the original entry pressure $\rho_{ow}$ value obtained from the laboratory (or literature value) for this parameter.
   iii. Insert this value into equation (1) and re-compute $T_{new}$ Calculate $$T_c - T_{new} = \Delta T$$

Figure 6:
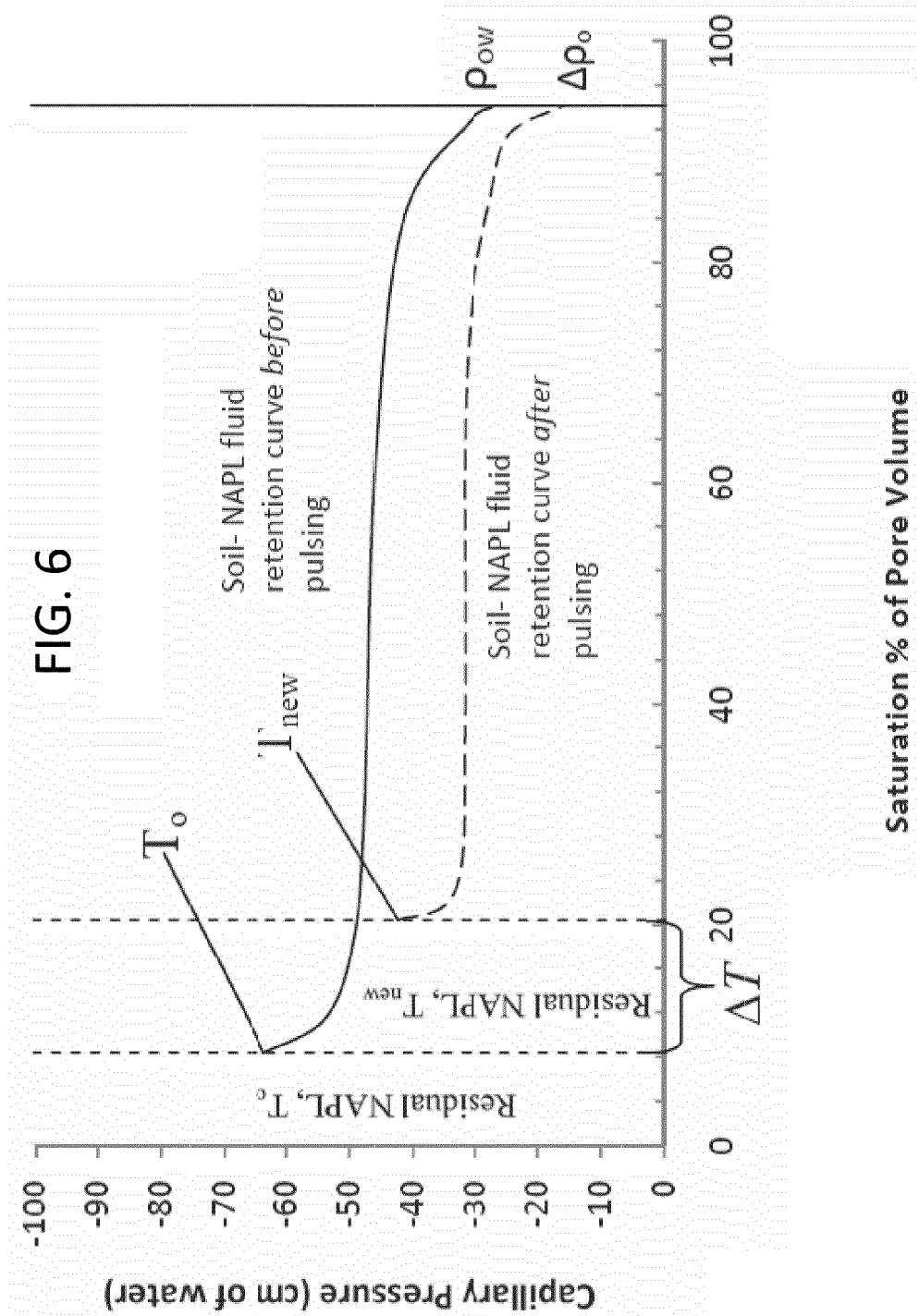
FIG. 6 is a fluid retention graph.

$\Delta T$ corresponds to a new capillary pressure and NAPL retention function, which in turn corresponds to the amount of residual now available for recovery. Refer to FIG. 6.
   iv. Apply Step 2 to $\Delta T$ and re-calculate the new recoverable volume. The difference between the original volume and the new volume is the residual volume/mass available for removal.

The operating principal in Case 1 is that the SPT process stresses the soil/rock matrix and causes the pore bodies and pore throats to expand and increase their interconnectivity. The soil/rock matrix consists of pore bodies of varying sizes and the pores are connected to each other by pore throats, much like a balloon and the much thinner stem through which it fills. The ratio of the diameter of the pore body (e.g. balloon) and the pore throat (balloon stem) very strongly influences the degree to which NAPL is held to the soil/rock matrix. The larger the ratio of the pore throat to the pore body, the greater the NAPL will be held in the soil/rock matrix. As this ratio decreases NAPL is held less strongly and is more able to flow (when all other factors are met). At some point, in response to SPT pulsing, the pore throat-pore body ratio may lower to a threshold value where the resistance to NAPL flow is reduced. At, or before, this point the NAPL thickness in the well can now overcome the resistance to flow in the soil/rock matrix. That is, less mechanical energy is now required, because of relaxing the resistance by reducing the ratio, so the NAPL flows out of the well and the thickness is reduced.

SPT pulsing acts differentially on the pore body and pore throat because of the difference in size. The mechanism by which this works is that when a pulse (subsurface pressure wave) traverses the medium it exerts force (mechanical energy) on the geologic matrix that results in pressure changes in the pores. Since pressure is energy per unit area (e.g., dynes per square centimeter or pounds per square inch), the force acting on the pore body is less than the force acting on the pore throat because the pore throat has a much smaller radius and opening size. As a result of the difference in force on the pore throat compared to the pore body, the pore throat opens more (force is the same but area is reduced). This effect can be easily seen on a larger scale along a shoreline, where "blowholes" evidence waves forcing their way into small openings and resulting in a water geyser. The geyser is a result of the dramatic pressure increase. This is analogous to what occurs on the pore-scale level in the soil/rock matrix. The result is a smaller ratio, i.e. the capillary pressure $P_c$, becoming greater than the entry (displacement) pressure $\rho_{ow}$, enabling the NAPL to move. The effect is greatest when the pulsing frequency and amplitude are optimized for the specific soil/rock type. Achieving the appropriate frequency and amplitude is an iterative process done in the field. Experience and knowledge of local conditions will have a far greater impact than any algorithm or process for determining frequency and amplitude values.

Case 2: Static LNAPL thickness, T, increases in well after test pulsing for a given duration.
   i. Measure the stabilized increase in LNAPL thickness. This increase above the static level is taken to be the new estimate of $\rho_{ow}$.
   ii. Add this thickness to the original $\rho_{ow}$ value obtained from the laboratory (or literature value) for this parameter.
   iii. Insert this value into equation (1) and re-compute $T_{new}$
   iv. Calculate $$T_{new} - T_o = \Delta T$$

v. Apply Step 2 to $\Delta T$ and re-calculate the new recoverable volume. The difference is the amount of residual volume/mass removed.

The operating principal in Case 2 is identical to that in Case 1 except that the pore throat to pore body ratio is not increased significantly, or quickly enough, so that $P_c$ remains less than or equal to the entry (displacement) pressure $\rho_{ow}$. In this instance, NAPL accumulates in the well from mobilized residual in response to pulsing and the thickness increases. The increase in NAPL thickness above static is then taken to equal or approximate the modified $\rho_{ow}$, which is then treated as in Case 2 steps (ii) through (v).

In practice, both Case 1 and Case 2 will occur within an area of interest. All the wells will have to be treated and adjusted individually before re-computing the new recoverable volume for the entire set of wells, using Step 2 to estimate the total residual available for recovery.

Figure 2:
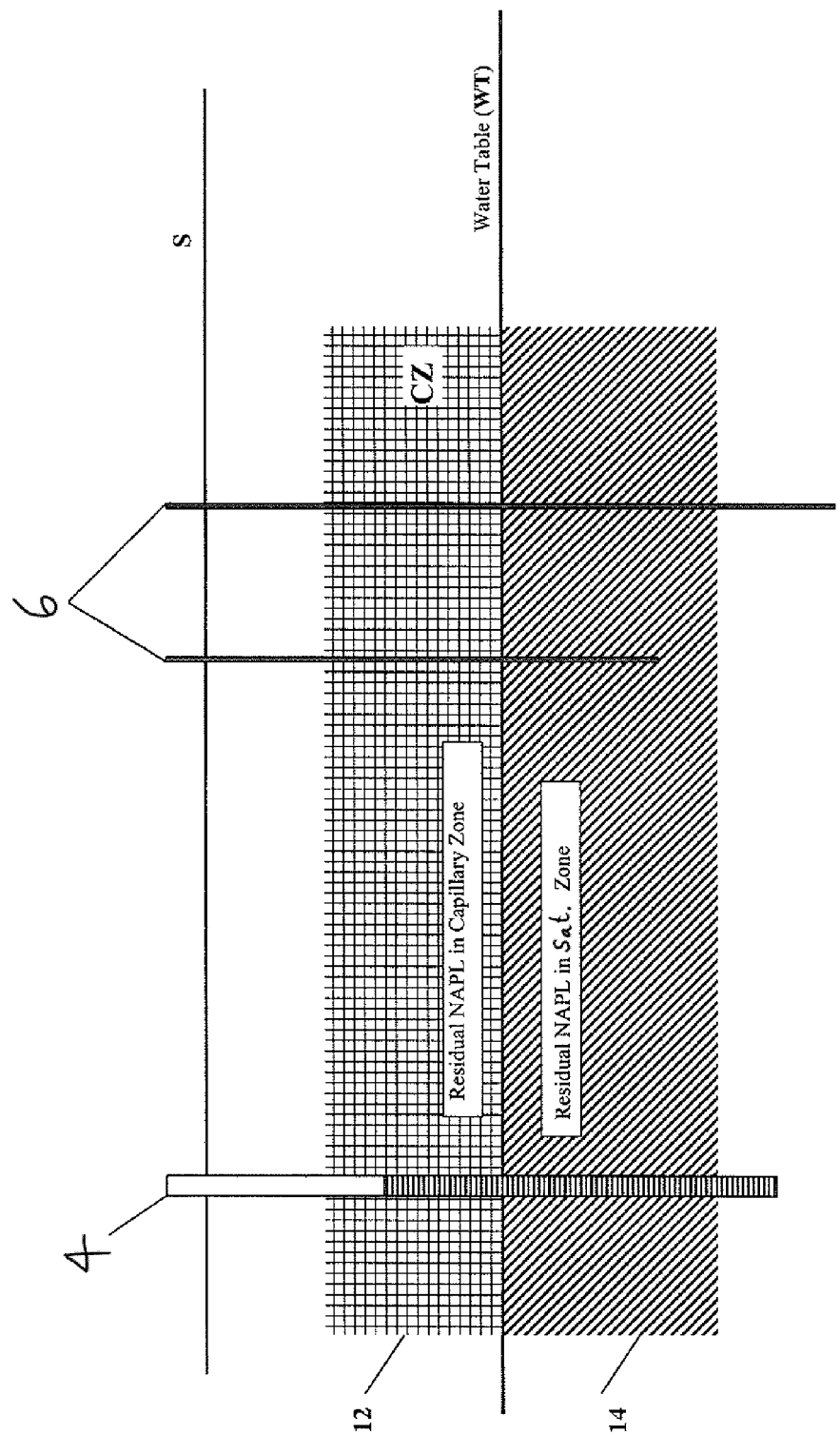
FIG. 2 is a view of a geologic cross-section showing the general location of LNAPL and DNAPL.

Referring now to FIG. 2 of the drawings, there is depicted a cross-section of the contaminated area. As shown in this preferred embodiment, the monitoring well(s) (4) and soil boring(s) (6) extend vertically through the contaminant area to be treated (12, 14). FIG. 2 shows the surface of ground (S), the capillary zone (CZ) extending from some distance above the surface of the water table (WT) and the saturated zone extending below the water table. The smear zone (12, 14) is the area above and below the water table that contains residual LNAPL. As also shown in FIG. 2, a non-aqueous phase non-value liquid contaminant in an undissolved state that occupies a portion of the contaminated area of the saturated zone (14) below the water table and a portion of the capillary zone (12) above the water table.

Figure 3:
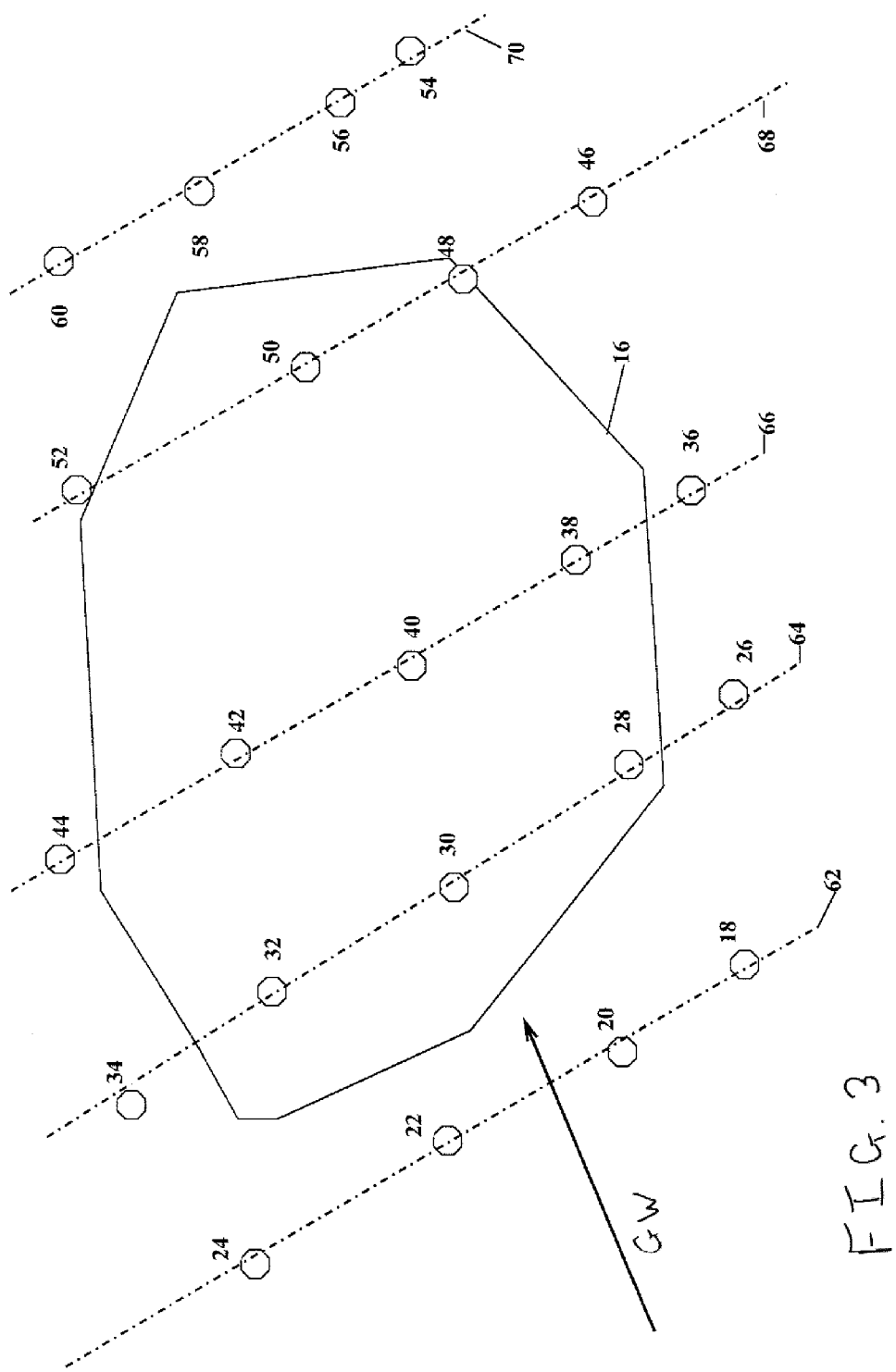
FIG. 3 is a plan view showing a general layout of wells and transects for estimating the contaminant mass flux.

Referring now to FIG. 3, there is depicted a DNAPL contamination scenario showing the defined DNAPL-impacted area (16) and a plurality of monitoring wells (18, 20, 22, 24, 26, 28, 30, 32, 34, 36, 38, 40, 42, 44, 46, 48, 50, 52, 54, 56, 58, 60) along transects (62, 64, 66, 68, 70) used to estimate the DNAPL mass flux. As shown in this preferred embodiment, monitoring wells extend across the surface of the ground, below which substantially lies the subsurface contaminated area to be treated. FIG. 3 also shows the preferred embodiment of monitoring wells used to develop an estimate of the DNAPL mass flux. The local flow of groundwater (GW) is shown by the arrow. The mass flux method for estimating DNAPL is used to develop an estimate of the total undissolved DNAPL before treatment using SPT technology and as a basis for measuring remediation following the application of SPT technology. FIG. 2 shows the generalized distribution of NAPL, either LNAPL or DNAPL, applicable to this process.

Figure 4:
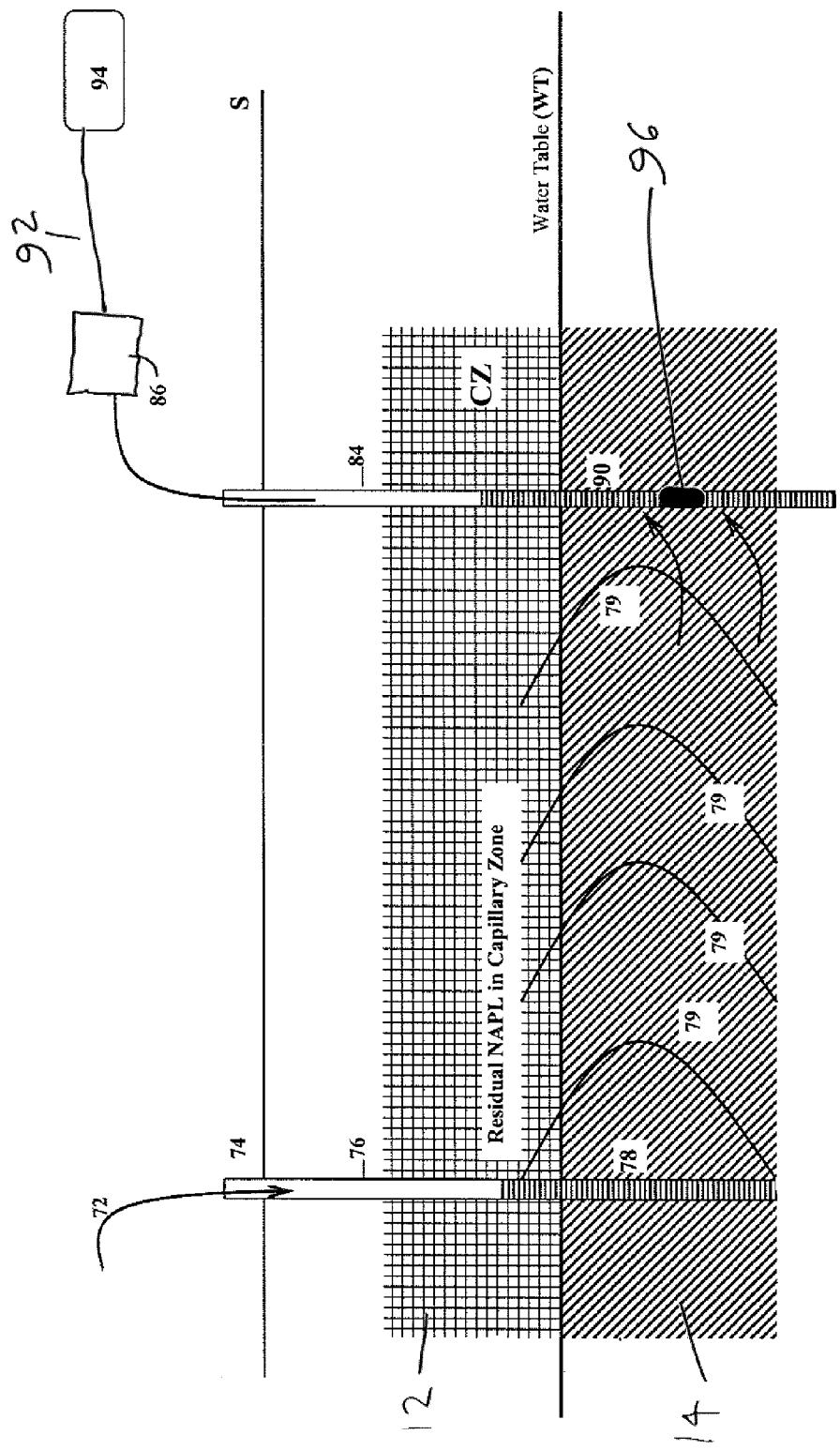
FIG. 4 is a sectional view showing a general placement of a SPT injection well, an extraction well, and a representation of the force used to promote a dynamic porosity to remove and/or treat subsurface contamination.

Referring now to FIG. 4, there is depicted the treatment process consisting of the pulsing apparatus (72) on the surface or inside the SPT injection/excitation well into which a fluid and/or treatment agent (74) is injected into the excitation well (76). The excitation well (76) is perforated or fitted with screens (78) (an open borehole may be used in the case of rock) to permit the injected fluid and/or treatment agent (74) to create pressure pulses (79) in the capillary zone (12) and the saturated zone (14) below the water table (WT) to be decontaminated. The injected fluid creates pulses (79) that emanate through the perforated or screened portion (78) of the excitation well (76), and in turn effect changes in the physical properties of the geologic medium (80, 82) (increasing conductivity and creating new openings for flow) that promote and enhance remediation.

The pulses open the pore spaces, voids, or apertures in the geologic medium and dispense and disperse fluids and contaminants toward the extraction well (84).

The extraction well (84) has a vacuum applied (86) that facilitates removal of the contaminants and/or prevents mobilized contaminants from reaching receptors. Removal is facilitated by the vacuum, the perforated or screened portion (90) of the extraction well (84). The extraction well (84) operates simultaneously or within one week following injection from the excitation well (76). Use of a vacuum applied to one or more extraction wells (84) results in a push-pull operation. The purpose of the vacuum on the extraction well(s) serves two purposes. One purpose is to enhance removal of the contaminant by creating a lower gradient towards which the contaminant will preferentially flow, also preventing the contaminant from reaching receptors. The second purpose of the vacuum is to generally create lower atmospheric pressure in the subsurface, i.e. without consideration for the existence of direction of a pressure gradient. Lowering the atmospheric pressure in the subsurface causes fluids to more readily flow through the pores, voids, or apertures in the geologic medium and thus further enhances the SPT process. LNAPL or DNAPL exits through the extraction well (84) via tubing or other means (92) and then to a container (94) for eventual treatment or removal off site.

In this preferred embodiment, the well screens or perforated portions (78, 90) of the excitation/injectoin well(s) (76) and extraction well(s) (84) extend into an area of undissolved liquid contaminant, or a non-aqueous liquid phase (NAPL), which occupies a portion of the saturated zone (14) and/or capillary zone (12) to be decontaminated. Such a non-aqueous liquid phase is oftentimes contained in a substantially well defined area, for example, when the subsurface saturated or capillary zone borders a stratum of clay or densely packed gravel, or some other substantially impermeably fill material. The present invention, however, also contemplates the pulsing of fluid and/or treatment agent via perforated riser bottoms (78) into contaminated subsurface areas which lack a non-aqueous liquid phase or which, due to particular subsurface geology, lack a well defined non-aqueous liquid phase zone. In either case, undissolved contaminating liquid hydrocarbons, if any, are dispersed throughout a greater portion of the subsurface contaminated area and, for example, are trapped within pore spaces, voids, or between subsurface strata.

A further plurality of spaced apart vertical excitation wells (76) and extraction wells (84) extending downward into the capillary zone (12) and saturated zone (14) below the water table (WT) for the extraction of contaminant-bearing groundwater are shown also contemplated in the preferred embodiment. Further, the well and extraction wells can also extend downward into the ground in an angular fashion relative to the surface of the ground, up to and even beyond a horizontal fashion, as desired or necessary.

Extraction well(s) (84) for removal of contaminant or contaminant-bearing groundwater from the capillary zone (CZ) and saturated zone (SZ) are connected to a suitable device for maintaining an induction force (e.g. a pump (86) for maintaining a vacuum or sub-atmospheric pressure) for drawing the contaminant-bearing groundwater and contaminants to the perforated portions (90) of extraction well(s). In the case of rock, open boreholes may be used, either alone or in combination with perforated portions (90).) The contaminant proceeds thusly to the surface for treatment and/or disposal. It is also contemplated in this invention that, depending on the depth of return risers, an additional withdrawing force, e.g. sub-atmospheric pressure, may be applied to the saturated zone (SZ) and/or capillary zone (CZ) by one or more pumps (96) installed at a subsurface location.

Groundwater containing extracted contaminants is received from extraction well (84) via line (92) and is deposited in storage tank (94) via vacuum pumps (86). Alternatively, the extracted material can be pumped to any conventional disposal apparatus.

In FIG. 4, there is shown a cross-sectional view of the preferred embodiments of excitation well(s) and extraction wells. At the upper ends of the excitation/injection well (76) and extraction well (84), breaching the surface of the ground (S), portions of the respective annular areas of ground, extending downward from S, are filled with a low permeability material, such as cement, grout, clay or compacted soil, to prevent wave pressure stimulus from short circuiting the excitation well (76). Similarly, the contemplated method includes treatment using SPT sources in a direct push mode in lieu of wells if deemed more appropriate give field conditions.

At the bottom end of each of the excitation and extraction risers (76, 84) extending into their respective boreholes into a subsurface saturated area (14) or capillary zone (12) to be treated in accordance with this invention, are perforations or screens (78, 90). In FIG. 4, fluid and/or treatment agents introduced through riser (76) flow via SPT pressure pulses through screen (78) into the annulus area and thereafter into a target area of the subsurface earth to be treated. In this preferred embodiment, the aperture size of the perforated or screened portions of the well (78) are engineered to maximize the pulsing effectiveness.

The preferred embodiment of the push-pull injection-extraction design in FIG. 4 is intended for use in groundwater extraction and/or monitoring wells situated in a capillary fringe zone (12) above and saturated zone (14) below the water table (WT). Extracted material(s) enter the perforated or screened area (90) from contiguous or surrounding areas of the contaminated subsurface and are thereafter drawn into extraction riser (84) through perforated portions of the screen (90) situated at the bottom end of the riser under the influence of an applied withdrawing force, such as sub-atmospheric pressure applied via a vacuum pump, to the extraction well as discussed above.

Figure 5:
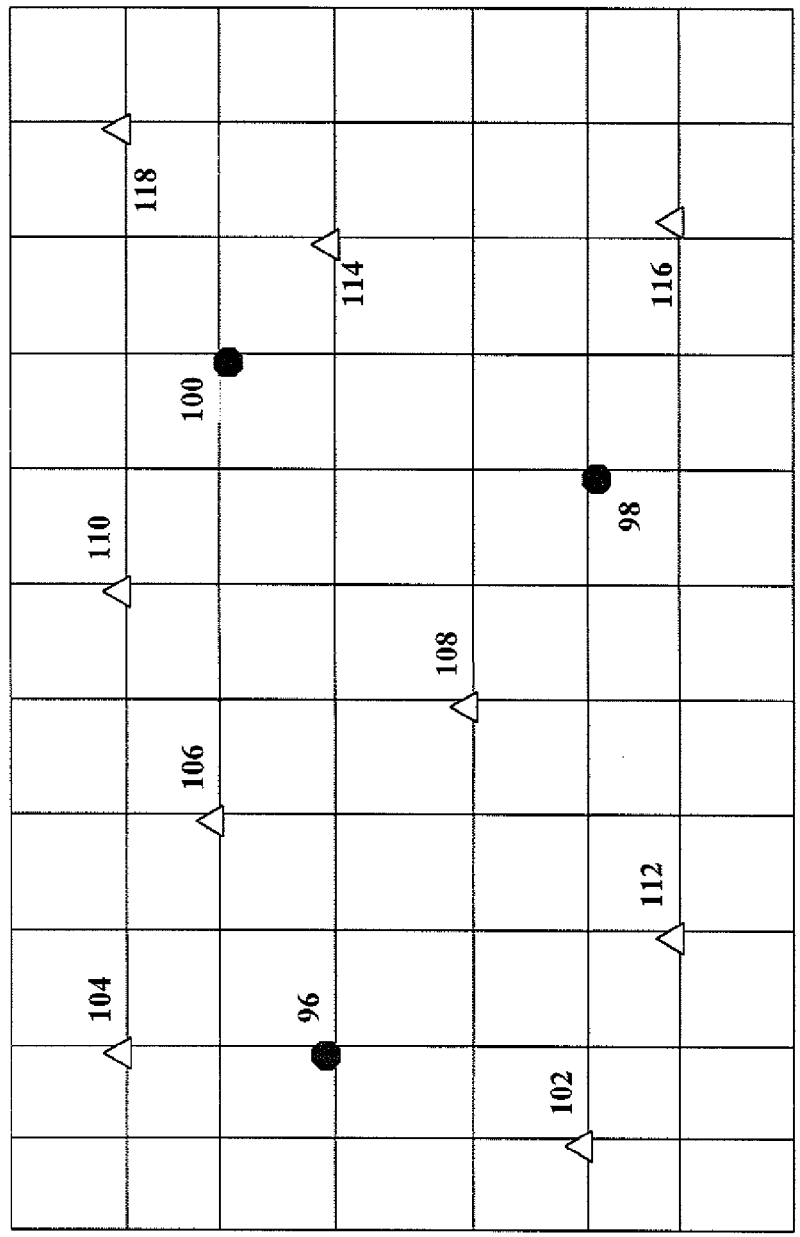
FIG. 5 is a plan view showing an embodiment of multiple SPT injection wells and extraction wells such that they encompass the contaminant mass.

Referring now to FIG. 5, there is shown a typical array of spaced apart injection/excitation wells (96, 98, 100) interspersed with an array of spaced apart extraction wells (102, 104, 106, 108, 110, 112, 114, 116, 118). While not specifically indicated, the extraction wells are intended to illustrate both extraction wells situated in the capillary fringe zone, the saturated zone or both. The spacing of each excitation well (96, 98, 100) is determined by such factors as the nature and extent of the contamination and by the particular nature of the subsurface geology to be decontaminated.

It is noted that the foregoing examples have been provided merely for the purpose of explanation and are in no way to be construed as limiting of the present invention. While the invention has been described with reference to various embodiments, it is understood that the words which have been used herein are words of description and illustration, rather than words of limitations. Further, although the invention has been described herein with reference to particular means, materials and embodiments, the invention is not intended to be limited to the particulars disclosed herein; rather, the invention extends to all functionally equivalent structures, methods and uses, such as are within the scope of the appended claims. Those skilled in the art, having the benefit of the teachings of this specification, may achieve numerous modifications thereto and changes may be made without departing from the scope and spirit of the invention in its aspects.

I claim:

1. A method for removal of non-aqueous phase liquid ("NAPL") contaminants from a contaminated volume of the earth, the method comprising the steps of:
   a. measuring a static NAPL thickness for one or more monitoring wells extending into the contaminated volume;
   b. calculating a recoverable NAPL value for the contaminated volume by:
      i. applying a stress and/or pulse to the contaminated volume by operation of one or more subsurface pulsing treatment apparatus;
      ii. measuring a stressed NAPL thickness in the monitoring wells; and
      iii. calculating a recoverable NAPL measurement utilizing the difference between the static NAPL thickness and stressed NAPL thickness;
   c. introducing a fluid into the contaminated volume of earth while the stress and/or pulse is applied to the contaminated volume of earth by the one or more subsurface pulsing treatment apparatus;
   d. applying a withdrawing force to the contaminated volume and, thereby, removing a portion of the fluid and the NAPL;
   e. measuring the amount of NAPL removed; and
   f. assessing the efficacy of removal by comparing the value of recoverable NAPL to the amount of NAPL removed.

2. The removal method of claim 1 further comprising the steps of:
   a. determining a NAPL saturation level over the contaminated volume.

3. The removal method of claim 1 wherein the contaminants are at least one of non-naturally occurring hydrocarbons and naturally occurring hydrocarbons.

4. The removal method of claim 1 wherein the step of introducing the fluid into the earth volume of interest utilizes one or more injection wells and the step of applying a withdrawing force utilizes one or more extraction wells.

5. The removal method of claim 4 wherein the stress and/or pulse is a plurality of subsurface treatment pulses and the subsurface treatment pulses are introduced to the contaminated volume via the injection wells.

6. A method for removal and/or in situ treatment of non-aqueous phase liquid ("NAPL") contaminants from subsurface area of the earth, the method comprising the steps of:
   a. determining an estimated NAPL mass over an earth volume of interest;
      i. calculating a residual NAPL saturation level;
   b. estimating at least one of a static volume and a static mass of recoverable NAPL over the earth volume of interest;
   c. determining a residual NAPL mass;
   d. estimating a NAPL thickness for one or more monitoring wells;
   e. calculating a value for recoverable NAPL by:
      i. applying a stress and/or pulse to the earth volume of interest by operation of one or more subsurface pulsing treatment apparatus;
      ii. measuring a change in NAPL thickness in the monitoring wells; and
      iii. calculating a revised recoverable NAPL measurement; and
   f. introducing a fluid into the earth volume of interest while the stress and/or pulse is applied to the earth volume of interest by the one or more subsurface pulsing treatment apparatus.

7. The method of claim 6 wherein the fluid is a treatment fluid that causes the NAPL to be chemically transformed into a non-contaminant.

8. The method of claim 6 further comprising the step of:
   a. applying a withdrawal force to the earth volume of interest to remove at least a portion of the fluid and NAPL.

9. The method of claim 8 further comprising the steps of:
   a. repeating the step of calculating the value of recoverable NAPL either with or without applying stress and/or pulse to the earth volume of interest; and
   b. determining the efficacy of NAPL removal.

10. The method of claim 6 further comprising the steps of:
    a. determining a post-treatment estimated NAPL mass over the earth volume of interest;
    b. calculating a post-treatment residual NAPL saturation level; and
    c. determining the efficacy of NAPL removal by comparing residual NAPL saturation level to the post-treatment residual NAPL saturation level.

11. The method of claim 10 further comprising the step of:
    a. introducing a fluid into the earth volume of interest.

12. The method of claim 6 wherein the step of introducing the fluid into the earth volume of interest utilizes one or more injection wells and comprising the further step:
    a. applying a withdrawing force on the earth volume of interest utilizing one or more extraction wells to remove a portion of the fluid and NAPL from the earth volume of interest.

13. The method of claim 12 wherein the stress and/or pulse is a plurality of subsurface treatment pulses and the subsurface treatment pulses are introduced to the earth volume of interest via the injection wells.

14. A method for removal and/or in situ treatment of non-aqueous phase liquid ("NAPL") contaminants from a subsurface area of the earth, the method comprising the steps of:
    a. calculating a value for recoverable NAPL comprising the steps of:
       i. applying a stress and/or pulse to an earth volume of interest by operation of one or more subsurface pulsing treatment apparatus; and
       ii. measuring a NAPL thickness in each of a plurality of monitoring wells;
    b. introducing a fluid into the earth volume of interest while the stress and/or pulse is applied to the earth volume of interest by the one or more subsurface pulsing treatment apparatus;
    c. extracting a portion of the fluid and the NAPL from the earth volume of interest;
    d. monitoring the amount of extracted NAPL;
    e. calculating a revised value for recoverable NAPL by measuring a NAPL thickness in each of a plurality of monitoring wells; and
    f. repeating the extracting step.

15. The removal method of claim 1 further comprising the step of increasing overall available, recoverable NAPL as compared to not using the pulsing treatment.

16. The removal method of claim 1, wherein the pulse and/or stress operates to: (i) cause NAPL thickness to decrease or increase; and (ii) reduce the resistance to NAPL flow such that the overall potential NAPL for extraction is increased, thereby allowing the NAPL to move at least one of within, through and from the contaminated volume.

17. The removal method of claim 1, wherein a change in the NAPL thickness occurs as a function of at least one of: one or more soil properties of the contaminated volume, one or more fluid properties of the introduced fluid, one or more properties of the NAPL, a frequency of the pulse and/or stress, the amplitude of the pulse and/or stress, the size of one or more pores of the one or more wells, an increase in conductivity of the contaminated volume caused by the stress and/or pulse, number of openings in the contaminated volume that are opened by the stress and/or pulse, a relationship between capillary pressure and the entry pressure of one or more pores or openings in the contaminated volume, a change of a ratio of the capillary pressure and the entry pressure of one or more pores or openings in the contaminated volume due to the stress and/or pressure; the fluid properties including at least one of: density, surface tension and interfacial tension; and the soil properties including at least one of: texture of the soil of the contaminated volume, particle size, permeability of the soil of the contaminated volume, soil pore size of the soil of the contaminated volume, aperture or throat size of the one or more soil pores of the soil of the contaminated volume, subsurface geology of the contaminated volume, conductivity of the contaminated volume, number of apertures or openings in the contaminated volume, mineral makeup, physical structure, and porosity.

18. The removal method of claim 1, further comprising determining the change in the amount of the NAPL that resulted from one or more changes in at least one of one or more aquifer properties and one or more fluid properties due to the pulse and/or stress.

19. The method of claim 6 further comprising the step of increasing overall available, recoverable NAPL as compared to not using the pulse treatment.

20. The method of claim 6, wherein the pulse and/or stress operates to: (i) cause NAPL thickness to decrease or increase; and (ii) reduce the resistance to NAPL flow such that the overall potential NAPL for extraction is increased, thereby allowing the NAPL to move at least one of within, through and from the earth volume of interest.

21. The method of claim 6, wherein a change in the NAPL thickness occurs as a function of at least one of: one or more soil properties of the earth volume of interest, one or more fluid properties of the introduced fluid, one or more properties of the NAPL, a frequency of the pulse and/or stress, the amplitude of the pulse and/or stress, the size of one or more pores of the one or more wells, an increase in conductivity of the earth volume of interest caused by the stress and/or pulse, number of openings in the earth volume of interest that are opened by the stress and/or pulse, a relationship between capillary pressure and the entry pressure of one or more pores or openings in the earth volume of interest, a change of a ratio of the capillary pressure and the entry pressure of one or more pores or openings in the earth volume of interest due to the stress and/or pressure; the fluid properties including at least one of: density, surface tension and interfacial tension; and the soil properties including at least one of: texture of the soil of the earth volume of interest, particle size, permeability of the soil of the earth volume of interest, soil pore size of the soil of the earth volume of interest, aperture or throat size of the one or more soil pores of the soil of the earth volume of interest, subsurface geology of the earth volume of interest, conductivity of the earth volume of interest, number of apertures or openings in the earth volume of interest, mineral makeup, physical structure, and porosity.

22. The method of claim 6, further comprising determining the change in the amount of the NAPL that resulted from one or more changes in at least one of one or more aquifer properties and one or more fluid properties due to the pulse and/or stress.

23. The method of claim 14 further comprising the step of increasing overall available, recoverable NAPL as compared to not using pulse treatment.

24. The method of claim 14, wherein the pulse and/or stress operates to: (i) cause NAPL thickness to decrease or increase; and (ii) reduce the resistance to NAPL flow such that the overall potential NAPL for extraction is increased, thereby allowing the NAPL to move at least one of within, through and from the earth volume of interest.

25. The method of claim 14, wherein a change in the NAPL thickness occurs as a function of at least one of: one or more soil properties of the earth volume of interest, one or more fluid properties of the introduced fluid, one or more properties of the NAPL, a frequency of the pulse and/or stress, the amplitude of the pulse and/or stress, the size of one or more pores of the one or more wells, an increase in conductivity of the earth volume of interest caused by the stress and/or pulse, number of openings in the earth volume of interest that are opened by the stress and/or pulse, a relationship between capillary pressure and the entry pressure of one or more pores or openings in the earth volume of interest, a change of a ratio of the capillary pressure and the entry pressure of one or more pores or openings in the earth volume of interest due to the stress and/or pressure; the fluid properties including at least one of: density, surface tension and interfacial tension; and the soil properties including at least one of: texture of the soil of the earth volume of interest, particle size, permeability of the soil of the earth volume of interest, soil pore size of the soil of the earth volume of interest, aperture or throat size of the one or more soil pores of the soil of the earth volume of interest, subsurface geology of the earth volume of interest, conductivity of the earth volume of interest, number of apertures or openings in the earth volume of interest, mineral makeup, physical structure, and porosity.

26. The method of claim 14, further comprising determining the change in the amount of the NAPL that resulted from one or more changes in at least one of one or more aquifer properties and one or more fluid properties due to the pulse and/or stress.

27. The removal method of claim 1, further comprising using the fluid to remove at least a portion of the NAPL from the contaminated volume of the earth while the stress and/or pulse is being applied.

28. The method of claim 6, further comprising using the fluid to remove at least a portion of the NAPL from the earth volume of interest while the stress and/or pulse is being applied.

29. The method of claim 14, further comprising using the fluid to remove at least a portion of the NAPL from the earth volume of interest while the stress and/or pulse is being applied.

* * * * *